(12) United States Patent
Lee

(10) Patent No.: US 7,519,557 B1
(45) Date of Patent: Apr. 14, 2009

(54) METHOD AND SYSTEM FOR VERIFYING USE OF A FINANCIAL INSTRUMENT

(75) Inventor: Timothy M. Lee, San Jose, CA (US)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 11/871,870

(22) Filed: Oct. 12, 2007

(51) Int. Cl.
*G06Q 40/00* (2006.01)

(52) U.S. Cl. ............... 705/44; 705/1; 705/26; 705/39; 705/30

(58) Field of Classification Search ......... 705/1, 705/26, 30, 36, 44; 235/379; 707/1–10, 707/100–104
See application file for complete search history.

(56) References Cited

U.S. PATENT DOCUMENTS

2001/0051917 A1* 12/2001 Bissonette et al. ............ 705/39

2007/0051795 A1* 3/2007 Shipman ................ 235/379

FOREIGN PATENT DOCUMENTS

| AU | 2001271968 | 3/2007 |
|---|---|---|
| WO | WO 02/05224 | 1/2002 |

OTHER PUBLICATIONS

"Trusted third parties in electronic commerce"; Authors: P. J. Skevington, T. P. Hart—Book Title "Internet and beyond" pp. 51-61. Publisher: Chapman & Hall, 1998.*
PCT International Search Report of PCT International Application No. PCT/US01/21725, Aug. 29, 2002, 2 pages.

* cited by examiner

*Primary Examiner*—Mary Cheung
*Assistant Examiner*—John H Holly
(74) *Attorney, Agent, or Firm*—Abelman Frayne & Schwab; Harry K. Ahn

(57) ABSTRACT

Methods and systems for verifying that a registrant is authorized to use a particular payment instrument are presented. A registering service initiates one or more verifying transactions involving the instrument. The registrant contacts the issuing financial institution to dispute the transaction and verifies his or her identity to the issuing financial institution, resulting in the registering service being contacted and verifying to the registering service that the registrant owns or controls the payment instrument.

18 Claims, 1 Drawing Sheet

METHOD AND SYSTEM FOR VERIFYING USE OF A FINANCIAL INSTRUMENT

BACKGROUND OF THE INVENTION

In the modern world, payment instruments are more and more taking the place of cash in commercial transactions. Additionally, an increasing percentage of commerce and commercial transactions is taking place at a distance, over untrusted networks such as the Internet.

While the use of such payment instruments and such networks makes it increasingly convenient to engage in commerce at any place and time, these instruments are subject to theft and fraudulent use. A thief may, by obtaining physical access to a payment instrument such as a credit card or cancelled check, often obtain sufficient information so as to allow him or her to engage in fraudulent transactions. It is often possible for a thief to engage in such fraudulent transactions before the rightful owner of the payment instrument is even aware that the instrument has been compromised.

One method known in the art to reduce these risks is to require the use of a secondary verification method, such as a password or "PIN" known only to the rightful instrument holder, with every transaction. This is inconvenient, however, as a particular instrument holder may have to remember multiple PINs for multiple payment instruments. It may also require payment systems to be redesigned.

Another method known in the art is for the desired target of a payment instrument transaction to initiate a verifying transaction using the instrument, for example, a de minimis deposit or debit of unpredictable amount. Only by contacting the financial or other institution associated with the payment instrument and authenticating one's identity can one learn the nature and amount of the "test" transaction. The user of the payment instrument submits this information back to the desired target of the payment instrument transaction, who then can be certain that other party is authorized to use the payment instrument. One problem with this method is that an actual transfer of value may take place, or multiple transactions may be required. This method may require financial institutions to perform systems integration, process changes, and retraining of customer service staff. Another problem is that, in theory, the amount of the transaction or transactions could be guessed or otherwise predicted.

It would be desirable to have methods and systems for verifying a party's authority to use a payment instrument or financial account.

The present disclosure is directed to solving or overcoming one or more of the problems described above in the context of remote transactions, though much of the distinct functionality of the described methods and systems also has unique value in face-to-face transactions.

BRIEF SUMMARY OF THE INVENTION

Before the present methods are described, it is to be understood that this invention is not limited to the particular methodologies or protocols described, as these may vary. It is also to be understood that the terminology used herein is for the purpose of describing particular embodiments only, and is not intended to limit the scope of the present disclosure, which will be limited only by the appended claims.

It must be noted that as used herein and in the appended claims, the singular forms "a," "an," and "the" include plural reference unless the context clearly dictates otherwise. Thus, for example, reference to a "transaction" is a reference to one or more transactions and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of the present invention, the preferred methods, devices, and materials are now described. All publications mentioned herein are incorporated herein by reference. Nothing herein is to be construed as an admission that the invention is not entitled to antedate such disclosure by virtue of prior invention.

In an embodiment, a registering party which verifies the authority of a registrant party to use a particular payment instrument or financial account may debit or credit the instrument or account. The claimed instrument holder then may dispute the transaction with the relevant financial institution, which may notify the registering party that the registrant is authorized to use the instrument.

BRIEF DESCRIPTION OF THE DRAWINGS

Aspects, features, benefits and advantages of the present invention will be apparent with regard to the following description and accompanying drawing, of which.

DETAILED DESCRIPTION OF THE INVENTION

Figure 1:
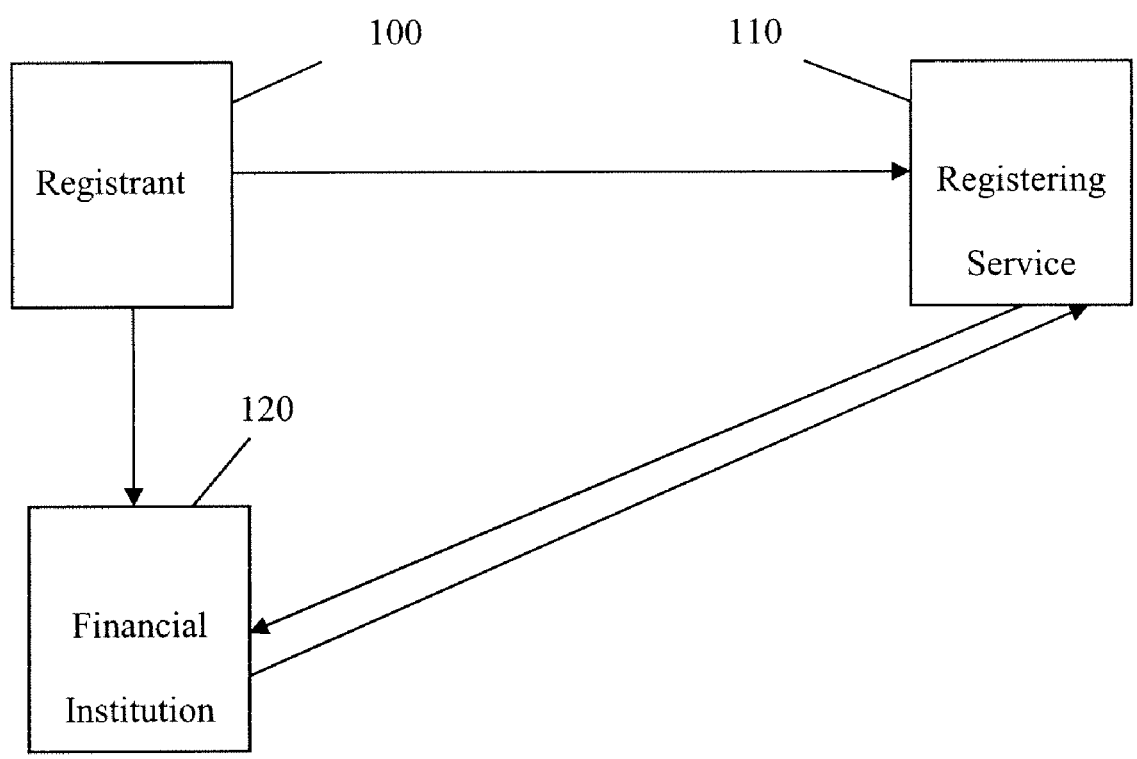
FIG. 1 depicts a dataflow diagram for exemplary participants in a verification transaction according to an embodiment.

A payment instrument is a financial instrument or account which can be used for financial transactions. For example, and without limitation, a payment instrument may be a credit card, a bank account, or an electronic check.

A registrant is a party claiming to have authority to engage in financial transactions using a payment instrument. For example, and without limitation, a registrant may be a customer.

A registering service is a party to whom the registrant represents that the registrant has authority to use the payment instrument. The registering service is interested in verifying that the registrant has authority to use the payment instrument. For example, and without limitation, a registering service may be a payment service provider.

A financial institution is the issuer or verifying authority associated with a particular payment instrument. For example, and without limitation, a financial institution may be a bank.

FIG. 1 depicts a dataflow diagram for exemplary participants in a transaction according to an embodiment. As shown in FIG. 1, the verification system may include a registrant 100, a registration service 110, and a financial institution 120. The registrant desires to use a particular payment instrument in transactions with the registering service. In order to facilitate such future transactions, the registrant may submit to the registering service information relating to the desired payment instrument. This information may be, for example and without limitation, an account number, credit card number, or the like. This information may be transmitted, for example and without limitation, in person, over a network such as the Internet, or via telephone, cellular phone, or other device or network.

Upon receiving the account information, the registering service may proceed to debit or credit the payment instrument by performing one or more transactions. These transactions may be performed, for example, over a payment network or using other appropriate means.

The registrant may then be instructed to contact his or her financial institution to dispute the one or more transactions. The disputed amount may be either the full amount, or the registering service may request that the registrant dispute a specified fraction of the transaction. The registrant may contact the financial institution using a website, phone, in person, or by any other means permitted by the particular financial institution. The financial institution may perform authentication of the registrant prior to processing the transaction dispute, using whatever methods it normally uses for processing transaction disputes.

In processing the dispute, the financial institution may reverse or partially reverse the one or more transactions, according to the disputed amount. The registering service may be notified of this reversal, or of the request for reversal, by the financial institution or by the payment network. If the registering service receives notification that the one or more transactions have been fully or partially reversed, or that a request has been made to fully or partially reverse the transaction by the appropriate amount, the registering service may permit the user to use the payment instrument.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A method by a registering service of verifying a purported registrant's ownership or control of a payment instrument, comprising:
   receiving information relating to the payment instrument;
   initiating through a transaction initiating interface one or more verifying transactions involving said payment instrument;
   generating and storing in a memory specified dispute amounts for one or more of said verifying transactions;
   informing, by said registering service, said purported registrant of said specified dispute amounts;
   receiving through a notification interface of said registering service a notification from a financial institution that one or more of said one or more verifying transactions has been disputed by one or more dispute amounts; and
   comparing by a dispute amount comparing module said dispute amounts to said stored specified dispute amounts to determine if said purported registrant has ownership or control of said payment instrument.

2. The method of claim 1, wherein said specified dispute amounts are less than the amounts of said one or more verifying transactions.

3. The method of claim 1, wherein said specified dispute amounts are unpredictable.

4. The method of claim 1, wherein the quantity of verifying transactions is larger than the quantity of dispute amounts.

5. The method of claim 4, wherein the verifying transactions to be disputed are selected from the verifying transactions in an unpredictable manner.

6. The method of claim 1, wherein said payment instrument is a credit card.

7. The method of claim 1, further comprising generating a notification relating to the result of comparing said dispute amounts to said specified dispute amounts.

8. A system for verifying a purported registrant's ownership or control of a payment instrument, comprising:
   an interface configured to receive information relating to the payment instrument;
   an interface configured to initiate one or more verifying transactions using said payment instrument;
   a module configured to generate specified dispute amounts for one or more of said verifying transactions;
   a memory configured to store said specified dispute amounts;
   an interface configured to inform said purported registrant of said specified dispute amounts;
   an interface for receiving notification from a financial institution that one or more of said one or more verifying transactions has been disputed by one or more dispute amounts; and
   a module configured to retrieve said specified dispute amounts from said memory, and for comparing said dispute amounts to said retrieved specified dispute amounts to determine if the purported registrant has ownership or control of said payment instrument.

9. The system of claim 8, further comprising an interface for communicating the result of comparing said dispute amounts to said retrieved specified dispute amounts.

10. The system of claim 8, further comprising a memory for storing the result of comparing said dispute amounts to said retrieved specified dispute amounts.

11. The system of claim 8, wherein said module configured to generate said generated dispute amounts comprises a source of unpredictable information.

12. The system of claim 8, wherein said payment instrument is a credit card.

13. A method by which a registrant verifies ownership or control of a payment instrument, comprising:
   transmitting through an information receiving interface of a registering service information relating to the payment instrument to said registering service;
   receiving through an informing interface of said registering service one or more dispute amounts relating to one or more verifying transactions; and
   initiating a dispute process relating to said dispute amounts with a payment instrument provider, wherein the dispute process comprises:
      authenticating the registrant's identity to the payment instrument provider,
      the payment instrument provider verifying that the registrant has ownership or control of said payment instrument, and
      the payment instrument provider transmitting through a notification interface of said registering service a notification that one or more of said one or more verifying transactions has been disputed by one or more dispute amounts.

14. The method of claim 13, wherein said dispute amounts are unpredictable.

15. The method of claim 13, wherein said payment instrument is a credit card.

16. The method of claim 13, wherein said one or more dispute amounts unpredictably relate to said one or more dispute amounts.

17. The method of claim 13, wherein said dispute amounts are smaller than said verifying transactions.

18. The method of claim 17, wherein said dispute amounts are unpredictably chosen.

* * * * *